Nov. 9, 1954  J. B. WINTHER  2,693,722
CLUTCH-BRAKE MECHANISM
Filed Nov. 21, 1951  2 Sheets-Sheet 1
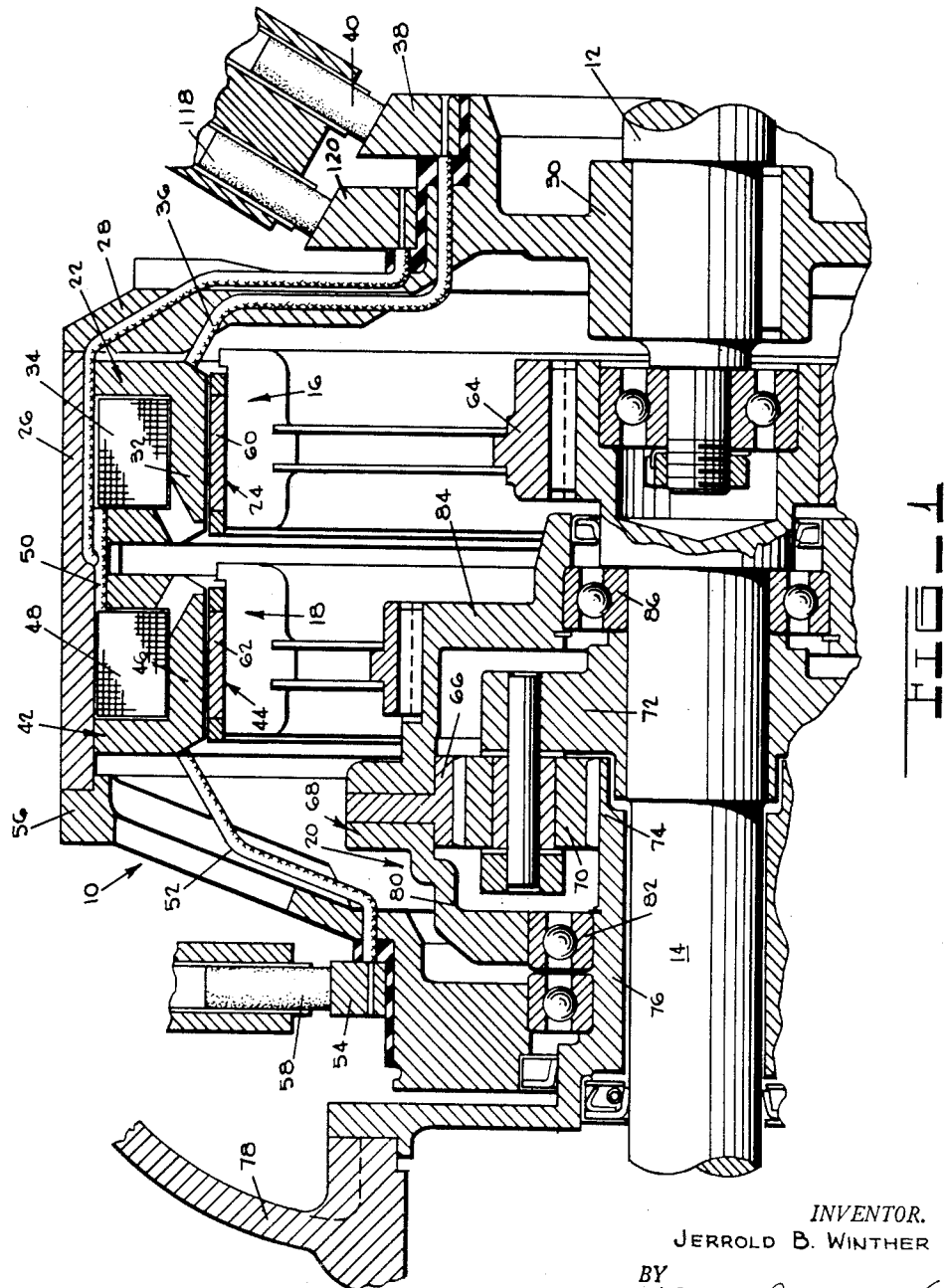
INVENTOR.
JERROLD B. WINTHER
BY
ATTORNEYS Nov. 9, 1954     J. B. WINTHER     2,693,722
CLUTCH-BRAKE MECHANISM
Filed Nov. 21, 1951     2 Sheets-Sheet 2
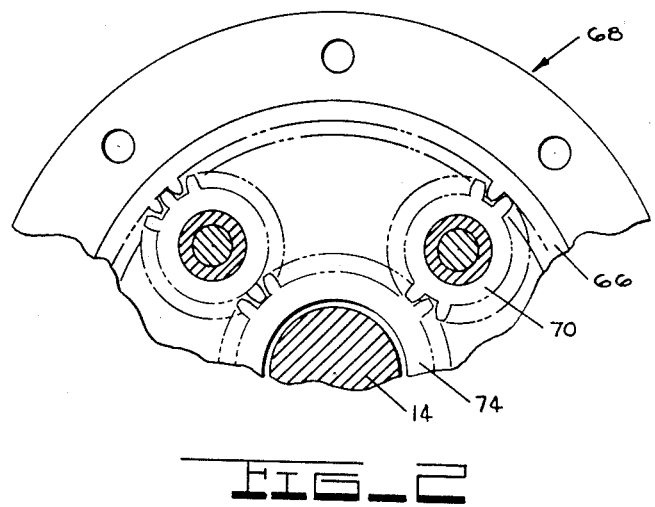
FIG_2
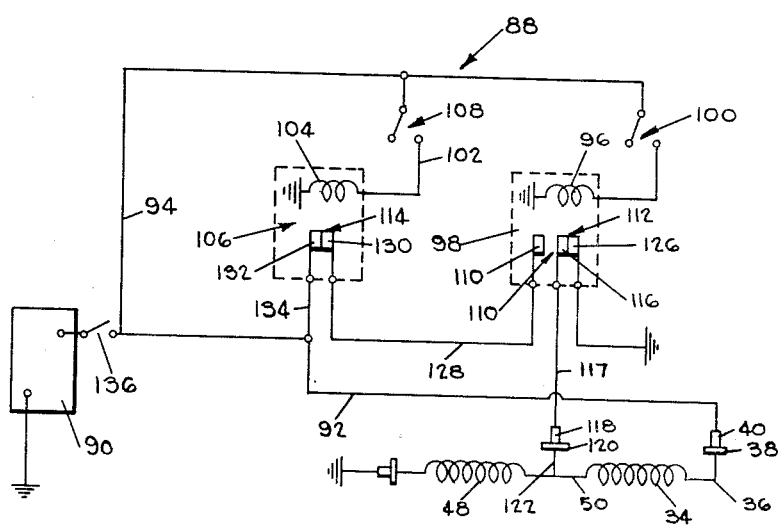
FIG_3
INVENTOR.
JERROLD B. WINTHER
BY
ATTORNEYS

United States Patent Office 2,693,722
Patented Nov. 9, 1954

2,693,722

CLUTCH-BRAKE MECHANISM

Jerrold B. Winther, Kenosha, Wis., assignor, by mesne assignments, to Eaton Manufacturing Company, Cleveland, Ohio, a corporation of Ohio Application November 21, 1951, Serial No. 257,623

11 Claims. (Cl. 74—750)

This invention relates to power transmitting mechanism and more particularly to combined clutching and braking means therefor.

Broadly the invention comprehends the provision of a power transmitting mechanism incorporating two slip torque or electromagnetic clutches therein which through appropriate gearing and energization control of the clutches, provide for two different speed ranges of operation of the mechanism or a braking of the mechanism.

Although numerous transmissions have been devised employing two or more power transmitting clutches, none have, prior to the present invention, so utilized two slip torque or electromagnetic clutches in arrangement between input and output members of a power transmitting mechanism together with gearing connection therebetween as to afford a braking action for the mechanism through the engagement of both clutches.

Among the objects of the invention are the provision of a power transmitting mechanism incorporating two slip torque or electromagnetic clutches and associated planetary gearing, that:

1. Is structurally simple and economical;
2. Can be simply and effectively controlled so as to afford two different output speed ranges or a braking action;
3. Affords the two different output speed ranges upon the independent energization of the clutches and the braking action upon the simultaneous energization of the clutches; and
4. Eliminates the necessity of utilizing a standard brake for braking the output of the mechanism.

Other objects and advantages of the invention will appear from the following description taken in connection with the drawings forming a part of the specification and in which:

Fig. 1 is a fragmentary vertical cross-section of a power transmitting mechanism, embodying the invention;

Fig. 2 is a fragmentary cross-sectional view taken substantially along lines 2—2 of Fig. 1; and Fig. 3 is a schematic wiring diagram for controlling the operation of the mechanism of Fig. 1.

Similar reference characters indicate corresponding parts throughout the several views of the drawings.

This power transmitting mechanism, embodying two slip torque or electromagnetic clutches preferably of the eddy current type together with interconnecting planetary gearing between input and output members of mechanism, was devised primarily as a simple and effective means of attaining two different ranges of speed output for given input speeds by way of energizing one clutch or the other and which through the simultaneous energization of both clutches effects a braking action upon the output of the mechanism.

The planetary gearing is suitably arranged between the output members of the clutches such that for the given operation of one clutch alone it has no bearing on the power transmission of the mechanism, and upon the operation of the other clutch alone it provides for a reduction in speed and increase in torque output of the mechanism. Upon the operation of both clutches, simultaneously, the planetary gearing by way of the output members of both clutches would impose a braking force upon the output member of the mechanism of an amount constituting the differential in torque between the clutch output members wherein one applies torque in a slow-down direction in excess of the torque applied by the other in a speed-up direction.

Referring to the drawings for more specific details of the invention 10 represents generally a power transmitting mechanism comprising basically a power input shaft 12, a power output shaft 14, two eddy current electromagnetic clutches 16 and 18 respectively, and planetary gearing 20.

Clutch 16 comprises a ring or input member 22 and rotor or output member 24. Input member 22 is mounted for rotation upon an annular member 26, which is in turn supported for rotation with input shaft 12 by way of flange or end closure member 28 having its hub 30 secured to shaft 12, and provides a plurality of interdigitated opposite polarity teeth 32 on its inner peripheral surface. An annular field coil 34 is supported in input member 22 and is supplied current by way of electrical conductor 36 connected at one end to the coil and terminating at its other end in a collector ring 38 insulatedly mounted upon a portion of flange member 28. A current conducting brush 40 connected to a source of current, not shown, is engageable upon ring 38.

Clutch 18 similarly to clutch 16 comprises a ring or input member 42 and a rotor or output member 44 with the input member 42 secured to member 26 axially spaced from member 22. The input member 42 is provided on its inner periphery with a plurality of interdigitated opposite polarity teeth 46 and supports an annular field coil 48 therein. Field coil 48 is connected at one end thereof by way of electrical conduit 50 to the opposite end of coil 34, from its connection with conduit 36 and is grounded by way of electrical conductor 52, connected to the opposite end thereof from conductor 50 connection therewith. Conductor 52 terminates at its opposite end, from connection with coil 48 in a collector ring 54, which ring is insulatedly supported upon a portion of an end closure member 56 and is engaged by a ground brush 58.

Output member 24 of clutch 16 includes an annular magnetic ring member 60 mounted in radially spaced relation to the teeth 32 of input member 22 of clutch 16 whereas output member 44 of clutch 18 includes an annular magnetic ring member 62 mounted in radially spaced relation to the teeth 46 of input member 42 of clutch 18.

The hub 64 of output member 44 of clutch 16 is fixedly secured to output shaft 14 of the mechanism so as to provide for rotation of output member 44 therewith.

The planetary gearing 20 includes a ring gear 66, supported on a housing 68 for the gearing, a plurality of planet pinion gears 70 journalled for rotation upon an annular member 72, which is in turn fixedly secured to the output shaft 14, and a sun gear 74 formed as part of a sleeve member 76 fixedly secured to a stationary member 78. The planetary gear housing 68 includes end plate 80 journalled at its hub upon bearing 82, which bearing is mounted upon sleeve member 76 and end plate 84 journalled at its hub upon bearing 86, which bearing is mounted on output shaft 14. The end plate 84 has the output member 44 of clutch 18 fixedly secured thereto, the purpose of which will hereinafter appear.

Fig. 3 illustrates one form of simple circuit 88 that can be utilized for effectively controlling the output of the power transmitting mechanism 10.

The circuit 88 is supplied current from a battery 90 or any other suitable source of electrical power and includes a conductor 92 connected between the battery and brush 40, a branch conductor 94 terminating in connection with a coil 96, of a relay 98, controlled as by a normally open make and break switch 100, a branch conductor 102 connected to branch conductor 94 terminating in connection with a coil 104, of a relay 106, controlled as by a normally open make and break switch 108. The relay 98 includes a normally open switch 110 and a normally closed switch 112 and relay 106 includes a normally closed switch 114.

A contactor 116 forming a common part of switches 110 and 112 is connected by conductor 117 to a brush 118 having current conducting engagement with a collector ring 120, said collector ring being connected by way of conductor 122 to conductor 50 connected between coils 34 and 48. Contactor 116 is normally spaced from contactor 124 of switch 110 and normally engages contactor 126 of switch 112, with contactor 124 being connected by a conductor 128 to a contactor 130 of switch 114 of relay 106 and contactor 126 being grounded.

Switch 114 includes in addition to contactor 130 a contactor 132 engageable therewith, said contactor 132 being in turn connected to conductor 92 by way of conductor 134.

Circuit 88 is completely under the control of a switch 136 arranged in conductor 92 intermediate the connection of the battery 90 and conductor 94.

In a normal operation of the power transmitting mechanism 10 rotation of input shaft 12, as induced by power being delivered thereto from any suitable source, causes a rotation of input members 22 and 42 of the respective clutches 16 and 18 whereby upon the closing of switch 136 current is supplied to field coil 34 of clutch 16 by way of conductor 92, brush 40, collector ring 38 and conductor 36, with the ground for the coil being made by way of closed switch 112. With the energization of coil 34 eddy currents are generated between the input and output members of clutch 16 such that the output member 24 is rotated providing for the delivery of power therethrough to the output shaft 14 of the clutch, connected thereto. During this phase of operation of the mechanism with field coil 34 energized and field coil 48 de-energized, the rotation of the input shaft is imparted as by way of clutch 16 to the output shaft without regard to the clutch 18 or planetary gearing.

When it is desired to obtain a decreased speed-increased torque output from the mechanism, it is only necessary to close switch 100 effective to provide for an energization of field coil 48 of clutch 18 and a de-energization of field coil 34. With the switch 100 closed, the coil 96 of relay 98 is energized resulting in closing switch 110 and opening switch 112 such that current is supplied to field coil 48 for the energization thereof by way of conductor 92, conductor 134, closed switch 114, conductor 128, closed switch 110, conductor 117, brush 118, collector ring 120, conductor 122 and conductor 50, with the coil grounded by way of conductor 52, collector ring 54 and brush 58. The opening of switch 112 disrupts the current flow circuit for coil 34 thus providing for its de-energization.

Upon the energization of coil 48 of clutch 18 and de-energization of coil 34 of clutch 16, the rotation of the input shaft 12 is imparted to input member 42 of clutch 18 whereby upon the generation of eddy currents between the input and output members of clutch 18 the output member 44 is rotated. Through the connection of ring gear 66, by way of housing 68, with the output member 44 of the clutch 18 and through the meshing arrangement of planet pinion gears 70 with the ring gear 66 and stationary sun gear 74, with the sun gear 74 functioning as a fulcrum, the output shaft 12 upon which the pinion gears 70 are journalled is rotated at a reduced speed from that when the clutch 16 is effecting coupling action between the input and output shafts of the mechanism. As such the planetary gearing 20 provides for a slower speed-higher torque output of the mechanism, for a given input speed, as compared to the drive through clutch 16.

A braking of the output shaft of the mechanism is obtainable upon the switches 136, 108 and 100 being closed such that a simultaneous energization of both field coils 34 and 48 is effected.

Immediately upon the simultaneous energization of both field coils 34 and 48 an opposing action will be set up between the output members 24 and 44 of the respective clutches 16 and 18, depending upon the relative speed therebetween as established by the gear ratio of the planetary gearing.

If for example the gear reduction through the clutch 18 to the output shaft 14 gives an output speed of 7/10 that obtained from clutch 16 and assuming that the output member 24 of clutch 16 is being rotated at 1600 R. P. M., the output member 44 of the clutch 18 will be stepped up in speed to a value which is a reciprocal of 7/10 or approximately 2250 R. P. M. With no torque being applied to the input members 22 and 42 of clutches 16 and 18 by way of input shaft 12, such that they rotate freely, and with both clutches energized, the immediate effect of the difference in rotation of output members 24 and 44 of the respective clutches is to establish a speed of the rotating input members of the clutches halfway between the speeds of the output members, that is the input members would assume the speed of approximately 1925 R. P. M.

Assuming that the torque being applied at each output member is 10 lb. ft. the output member 44 of clutch 18 would multiply the torque by 1.43 (gear ratio) and thus tend to slow down output shaft 14 through the planetary gears whereas the output member 24 of clutch 16, in running 325 R. P. M. slows the input members, would apply 10 lb. ft. torque directly to output shaft 14, but in a direction tending to increase the speed of the output shaft.

Since the output member 44 applies 14.3 lb. ft. torque (1.43×10 lb. ft.) in a slowdown direction or 4.3 lb. ft. torque more than the 10 lb. ft. torque applied in the speed-up direction by output member 24, the result is a net brake action of 4.3 lb. ft. torque upon the output shaft 14.

This braking action upon shaft 14 will effect a definite retardation or slowing down of the mechanism effective to eventually bring it to a standstill.

Although this mechanism has been described in connection with specific illustration as to the form of clutches and gearing employed, it is susceptible of numerous changes as may be apparent to those skilled in the art without departing from the basic concepts thereof and accordingly invention is to be limited to the extent expressed by the appended claims.

What I claim is:

1. Power transmitting mechanism comprising a slip torque clutch including cooperative driving and driven elements, a second slip torque clutch including cooperative driving and driven elements, a planetary gear system, drivingly connected between one of the elements of the first mentioned clutch and the like element of the second clutch, including ring, sun and panet pinion gears with the planet pinions in meshing relation intermediate the ring and sun gears, with the planet pinions supported for rotation on the said one element of one of the clutches and the ring gear connected to the said element of the other clutch, and with the sun gear stationary said other like elements of the clutches being connected together, and means for controlling the operation of the clutches independently or simultaneously, wherein upon operation of the clutches individually two varied stages of speed are provided at the output shaft whereas upon simultaneous operation of the clutches a braking action of the output shaft results.

2. Mechanism according to claim 1 wherein the clutches are of the electromagnetic type and the means for controlling the operation of the clutches is a circuit for energizing the clutches.

3. Mechanism according to claim 1 wherein the gear system is drivingly connected between the driven elements of the clutches and wherein the driving elements of the clutches are connected together.

4. Mechanism according to claim 2 wherein each of the clutches includes an electromagnetic coil arranged in the circuit.

5. Power transmitting mechanism comprising input and output members, an electromagnetic clutch including cooperative driving and driven elements, one connected to the input member and the other connected to the output member, a second electromagnetic clutch including cooperative driving and driven elements, a planetary gear system including a ring gear, a stationary sun gear and planet pinion gears in meshing relation intermediate the sun and ring gears, said planetary gear system being drivingly connected between one of the members, and one of the elements of the second clutch, with the planet pinions supported for rotation on one of the members and the ring gear connected to one element of the second clutch with the other element of the second clutch connected to the other member, and a circuit for independently or simultaneously, energizing the electromagnetic clutches wherein upon operation of the clutches individually two varied stages of speed are provided at the output shaft whereas upon simultaneous operation of the clutches a braking action of the output shaft results.

6. Mechanism according to claim 5 wherein the member having the planet pinion gears supported thereon is the output member.

7. Mechanism according to claim 6 wherein the driven element of the first mentioned clutch is connected to the output shaft and the driving element thereof is connected to the input member.

8. Mechanism according to claim 7 wherein the ring gear is connected to the driven element of the second mentioned clutch and the driving element of said clutch is connected to the input member.

9. Power transmitting mechanism comprising an input shaft and an output shaft, a slip torque clutch including cooperative driving and driven elements with one of the elements connected to one of the shafts, a second slip torque clutch including cooperative driving and driven elements, a gear system, drivingly connected between one of the elements of the first clutch which is connected to one of the shafts and one of the elements of the second clutch, including a plurality of intermeshing gears, one of which is stationary and means for controlling the operation of the clutches for the independent or simultaneous operation thereof wherein upon operation of the clutches individually two varied stages of speed are provided at the output shaft, whereas upon simultaneous operation of the clutches a braking action of the output shaft results.

10. A mechanism according to claim 9 wherein the gear system is planetary in nature and includes ring, sun and planet pinion gears with the planet pinions in meshing relation intermediate the ring and sun gears and wherein one of said gears is stationary and the other of said gears are respectively connected to the first mentioned elements of the clutches.

11. A mechanism according to claim 10 wherein the planet pinions are supported for rotation on one of the first mentioned elements of one of the clutches and one of the other gears is stationary and the other gear is connected to the first mentioned element of the other clutch.

References Cited in the file of this patent

UNITED STATES PATENTS

| Number | Name | Date |
|---|---|---|
| 2,066,952 | Tornebohm | Jan. 5, 1937 |
| 2,224,254 | Cotal | Dec. 10, 1940 |
| 2,248,133 | Snow | July 8, 1941 |
| 2,545,040 | Morgan | Mar. 13, 1951 |

FOREIGN PATENTS

| Number | Country | Date |
|---|---|---|
| 107,032 | Sweden | Apr. 6, 1943 |
| 267,768 | Switzerland | Apr. 15, 1950 |
| 387,623 | France | July 18, 1908 |
| 602,521 | Germany | July 6, 1933 |